United States Patent [19]

Fujiya

[11] Patent Number: 4,507,010

[45] Date of Patent: Mar. 26, 1985

[54] PANEL FASTENER

[76] Inventor: Toshimichi Fujiya, No. 4-22, Kounandai 6-chome, Kounan-ku, Yokohama-shi, Kanagawa-ken, Japan

[21] Appl. No.: 471,222

[22] Filed: Mar. 2, 1983

[51] Int. Cl.[3] .............................................. F16B 21/00

[52] U.S. Cl. .................................... 403/322; 403/323; 403/407; 403/409; 52/127.9; 292/98

[58] Field of Search .................... 52/127.9, 127.7, 584; 292/165, 98, 107; 403/330, 322, 323, 407, 409

[56] References Cited

U.S. PATENT DOCUMENTS

| | | | |
|---|---|---|---|
| 2,647,287 | 8/1953 | Jones | 292/98 X |
| 2,714,751 | 8/1955 | Stuart et al. | 403/321 X |
| 3,191,244 | 6/1965 | Burke | 52/129.9 |
| 3,365,223 | 1/1968 | Bisbing | 403/20 |
| 3,472,545 | 10/1969 | Berkowitz | 52/127.9 X |
| 3,565,469 | 12/1968 | Zwart | 52/584 X |
| 3,661,410 | 5/1972 | Larson et al. | 52/127.9 |
| 3,671,006 | 6/1972 | Berkowitz | 52/129.2 X |
| 3,712,653 | 1/1973 | Lehmann | 52/584 |
| 4,020,613 | 5/1977 | Reynolds et al. | 403/321 |
| 4,129,021 | 12/1978 | Brentini | 70/459 X |

FOREIGN PATENT DOCUMENTS

| | | | |
|---|---|---|---|
| 156277 | 4/1954 | Australia | 52/127.9 |

*Primary Examiner*—Richard J. Scanlan, Jr.
*Attorney, Agent, or Firm*—Martin Smolowitz

[57] ABSTRACT

A panel fastener having a first section to be buried in one panel and a second section to be buried in another mating panel, said first section including: a hook plate fitted to an eccentric cam rotatably provided in said first section; and a leaf spring forced in between said hook plate and said eccentric cam. The two panels are connected and fastened together by rotating said eccentric cam in order to rotate said hook plate together with said eccentric cam, and by further rotating said cam in order to allow an end hook portion of said hook plate and a pin provided in said second section to tightly engage with each other. The panel fastener comprises a means for restricting rotational angles of said eccentric cam with respect to said hook plate within a specific range.

The panel fastener can reliably connect and fasten the panels together without any possibilities of failure of engagement between the hook plate and the pin due to an erroneous operation.

1 Claim, 18 Drawing Figures

PANEL FASTENER

BACKGROUND OF THE INVENTION

The present invention relates to a panel fastener employed for connecting and fastening side wall panels or the like of prefabricated large-sized refrigerators or freezers.

In the conventional panel fastener disclosed in Japanese Utility Model Publication No. 12310/1978, a relief recess formed in a part of the inner peripheral surface of a cam-receiving hole of a hook plate and a spring-mounting recess formed in a part of the outer peripheral surface of an eccentric cam are aligned with each other for mounting a C-shaped leaf spring in a free state, and then, the eccentric cam is rotated 45 degrees in a specific direction in order to allow a circular portion of the leaf spring to slip out of the relief recess and bring the leaf spring into resilient contact with the circular inner peripheral surface of the cam-receiving hole. In the panel fastener thus assembled, when the side edge of the end portion of the hook plate is brought into contact with a pin provided to the mate panel, an eccentric projecting shaft of the eccentric cam is on an extension of a segment of a line connecting the pin and the center of the eccentric cam with each other, and rotating the eccentric cam further 180 degrees in the specific direction causes the hook plate to be pulled toward the panel concerned by double the eccentric distance, thereby allowing the hook part formed at the end of the hook plate to tightly engage with the pin.

In this panel fastener, however, the eccentric cam is adapted to be rotatable 360 degrees with respect to the hook plate. Therefore, if the eccentric cam is rotated more than 180 degrees, the hook plate is undesirably advanced toward the mate panel, causing the engagement between the hook part and the pin to be loosened, so that it is impossible to connect and fasten the panels to each other. Moreover, in the case where the eccentric shaft of the eccentric cam is not on the extension of the segment of the line connecting the pin and the center of the eccentric cam with each other when the side edge of the end portion of the hook plate is brought into contact with the pin, since the eccentric cam has been rotated in the direction opposite to the above-mentioned specific direction with respect to the hook plate, even if the eccentric cam is rotated 180 degrees in the specific direction, the hook plate cannot be satisfactorily pulled back toward the panel concerned. Accordingly, it is absolutely impossible to establish a tight engagement between the end hook part of the hook plate and the pin.

Summary of the Invention

It is, therefore, an object of the invention to provide a panel fastener capable of always reliably connecting and fastening the panels together without any possibilities of failure of engagement between the hook plate and the pin due to an erroneous operation and loosening or undoing of the engagement once established.

A panel fastener according to the invention features provision of a means for restricting the forward and reverse rotational angles of the eccentric cam with respect to the hook plate within a specific range.

The invention will be described hereinunder in greater detail through a preferred embodiment with reference to the accompanying drawings.

DETAILED DESCRIPTION OF THE PREFERRED EMBODIMENT

Figure 1:
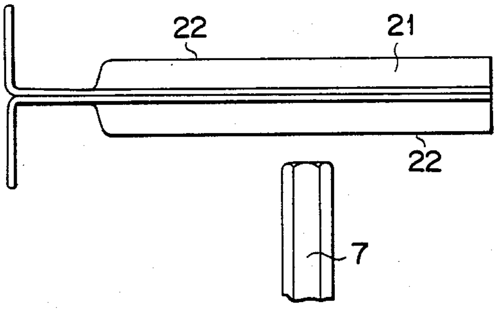
FIGS. 1 through 3 are a plan view, front elevational view and right-side elevational view of a first section of a panel fastener in accordance with a preferred embodiment of the invention, respectively, a rotational operation member being omitted in FIGS. 2 and 3.
Figure 2:
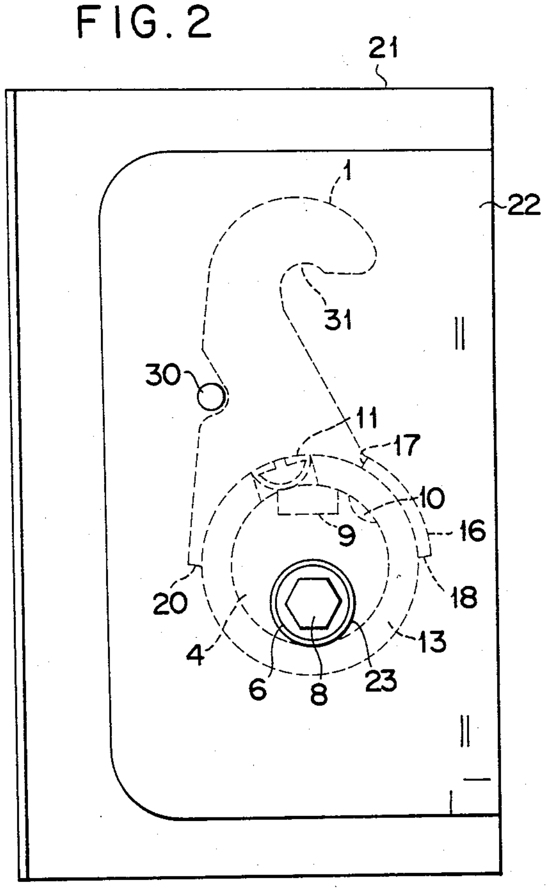
Figure 3:
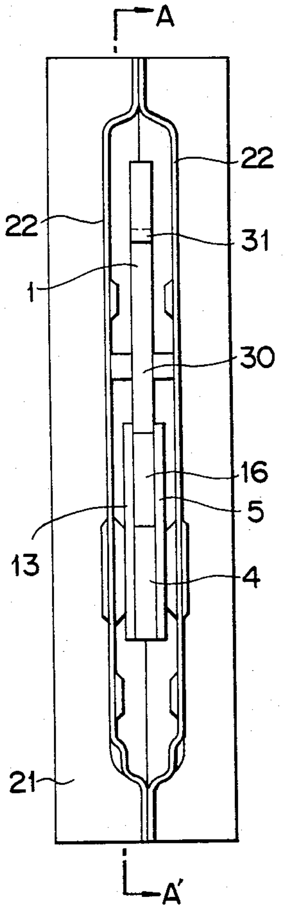
Figure 4:
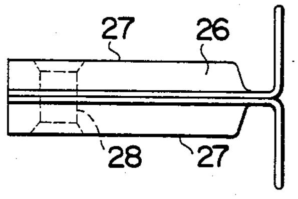
FIGS. 4 through 6 are a plan view, front elevational view and left-side elevational view of a second section of the panel fastener in accordance with the preferred embodiment of the invention, respectively.
Figure 5:
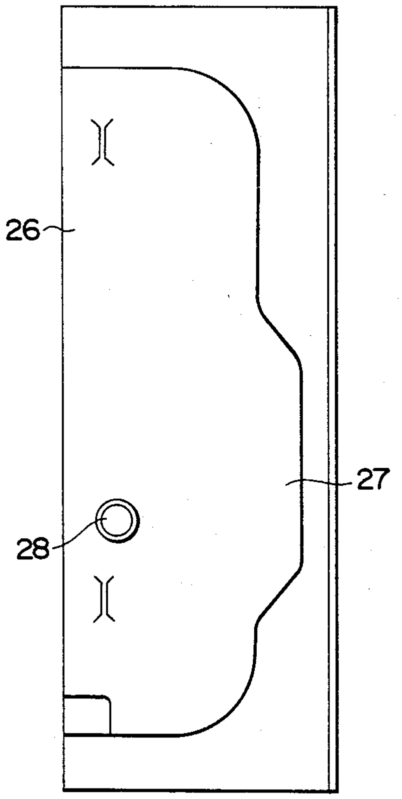
Figure 6:
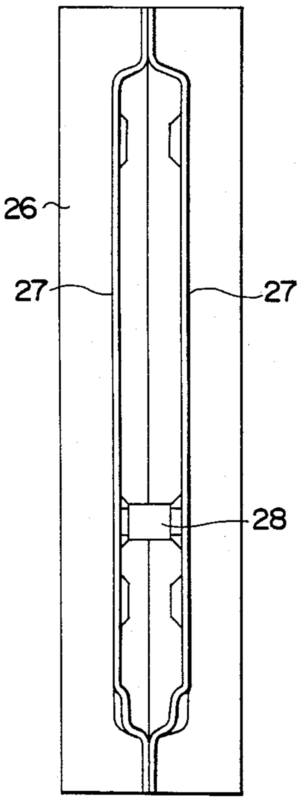
Figure 10:
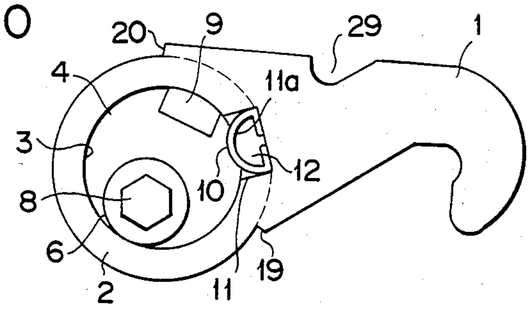
FIGS. 10 and 11 illustrate an eccentric cam, hook plate and leaf spring to be mounted on the first section shown in FIGS. 1 through 3 in an assembled state, FIG. 10 being a front elevational view thereof in the state where the leaf spring is inserted, FIG. 11 being a front elevational view thereof in the state where the eccentric cam is rotated to compress the leaf spring.
Figure 11:
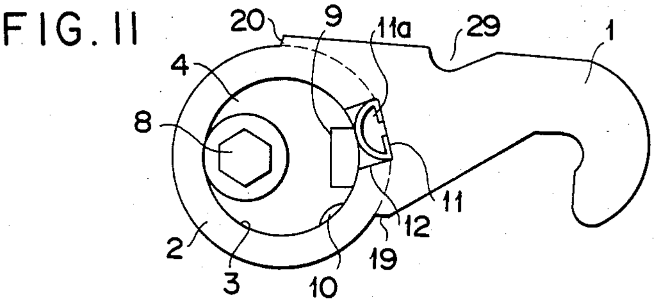
Figure 12:
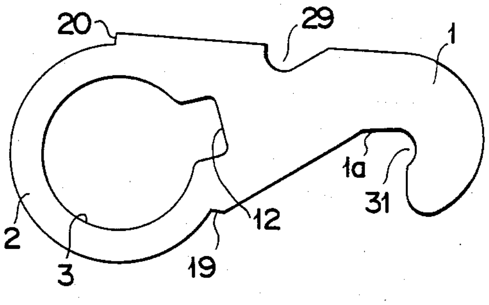
FIGS. 12 through 18 individually illustrate parts to be mounted on the first section shown in FIGS. 1 through 3, FIGS. 12 and 13 being a front elevational view and bottom view of the hook plate, respectively, FIG. 14 being a front elevational view of the eccentric cam, FIG. 15 being a sectional view of the eccentric cam taken along a line B—B' of FIG. 14, FIG. 16 being a front elevational view of a rotational angle-restricting disc, FIG. 17 being a sectional view of the rotational angle-restricting disc taken along a line C—C' of FIG. 16, FIG. 18 being an enlarged front elevational view of the leaf spring.
Figure 13:
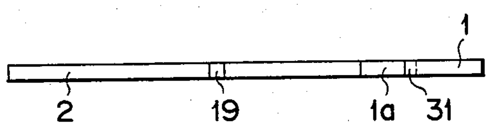
Figure 14:
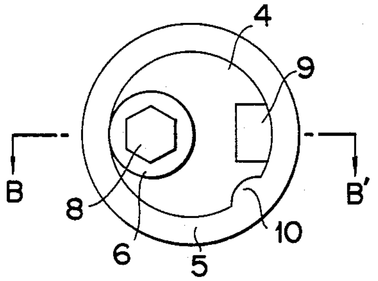
Figure 16:
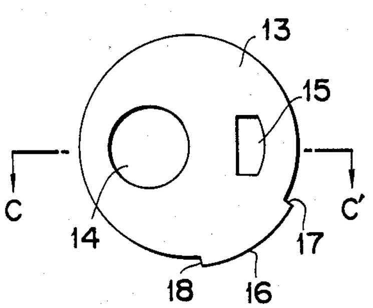
Figure 15:
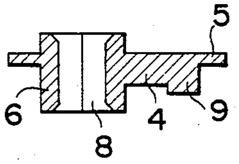
Figure 17:
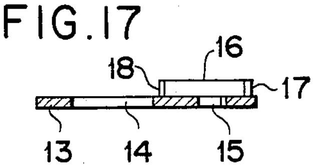
Figure 18:
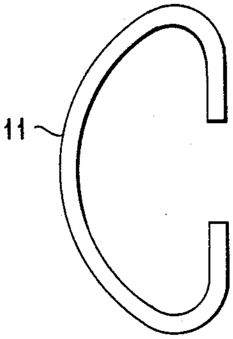

As shown in FIGS. 2, 10 and 14, an eccentric cam 4 fitted in a cam-receiving hole 3 formed in a proximal end portion 2 of a hook plate 1 has on one side surface thereof a larger-diameter guide disc part 5 adapted to slidably contact a side surface of the proximal end portion 2. An eccentric shaft 6 is projected from the other side surface of the eccentric cam 4 and the guide disc part 5 perpendicularly thereto. Both ends of the eccentric shaft 6 are fitted into bearing holes 23 formed in a pair of side plates 22 of a first section 21, respectively. The eccentric shaft 6 is provided with a receiving hole 8 for a rotational operation member 7 with a hexagonal section. A locking projection 9 is provided on the other side surface of the eccentric cam 4 so as to face the eccentric shaft 6 on a diameter of the eccentric cam 4. A relief recess 10 is formed in a part of the outer peripheral surface of the eccentric cam 4 so as to be apart from the locking projection 9 by 45 degrees with respect to the center of the eccentric cam 4. A leaf spring 11 to be forced in between the hook plate 1 and the eccentric cam 4 is bent into a substantial C shape and mounted in a free state by aligning the position of a spring-mounting recess 12 formed in a part of the inner peripheral surface of the cam-receiving hole 3 and the position of the relief recess 10 with each other, as shown in FIG. 10. Then, as shown in FIG. 11, the eccentric cam 4 is rotated with respect to the hook plate 1 in order to allow a circular portion 11*a* of the leaf spring 11 to slip out of the relief recess 10 and bring the leaf spring 11 into resilient contact with the inner peripheral surface of the cam-receiving hole 3, causing a frictional force which prevents a free rotation between the hook plate 1 and the eccentric cam 4, to be produced therebetween. Accordingly, the hook plate 1 rotates integrally with the eccentric cam 4, following the same.

As a rotational angle-restricting means for limiting the rotation of the eccentric cam 4 with respect to the hook plate 1 within a specific range, a disc 13 is employed having a diameter equal to that of the proximal end portion 2 of the hook plate 1 and the guide disc part 5 of the eccentric cam 4. The rotational angle-restricting disc 13 is mounted on the eccentric cam 4 in the stage where the eccentric cam 4 has been rotated clockwise from the position shown in FIG. 10 by more than 60 degrees with respect to the hook plate 1. The leaf spring 11 is prevented from coming off since it is clamped between the guide disc part 5 of the eccentric cam 4 and the rotational angle-restricting disc 13. An eccentric shaft-receiving hole 14 and a locking projection-receiving slot 15 formed in the rotational angle-restricting disc 13 so as to face each other on the same diameter thereof are fitted with the eccentric shaft 6 and the locking projection 9, respectively, so that the rotational angle-restricting disc 13 and the eccentric cam 4 are connected together so as to be unable to rotate relative to each other. A stopper projection 16 is formed, projecting radially, on a portion of the outer peripheral surface of the rotational angle-restricting disc 13. Both end surfaces 17, 18 of the stopper projection 16 in combination make an angle of 55 degrees with respect to the center of the rotational angle-restricting disc 13. The center of the locking projection-receiving slot 15 and one end surface 17 of the stopper projection 16 are spaced from each other by an angle of 30 degrees with respect to the center of the rotational angle-restricting disc 13. The hook plate proximal end portion 2 has stopper walls 19, 20 radially projected from both ends of the circumferential surface thereof. The stopper walls 19, 20 are spaced from each other by an angle of 120 degrees with respect to the center of the cam-receiving hole 3. The center of the spring-mounting recess 12 and one stopper wall 19 are also spaced from each other by an angle of 45 degrees with respect to the center of the cam-receiving hole 3. These stopper walls 19 and 20 are adapted to abut against the end surfaces 17 and 18 of the stopper projection 16, respectively.

Figure 7:
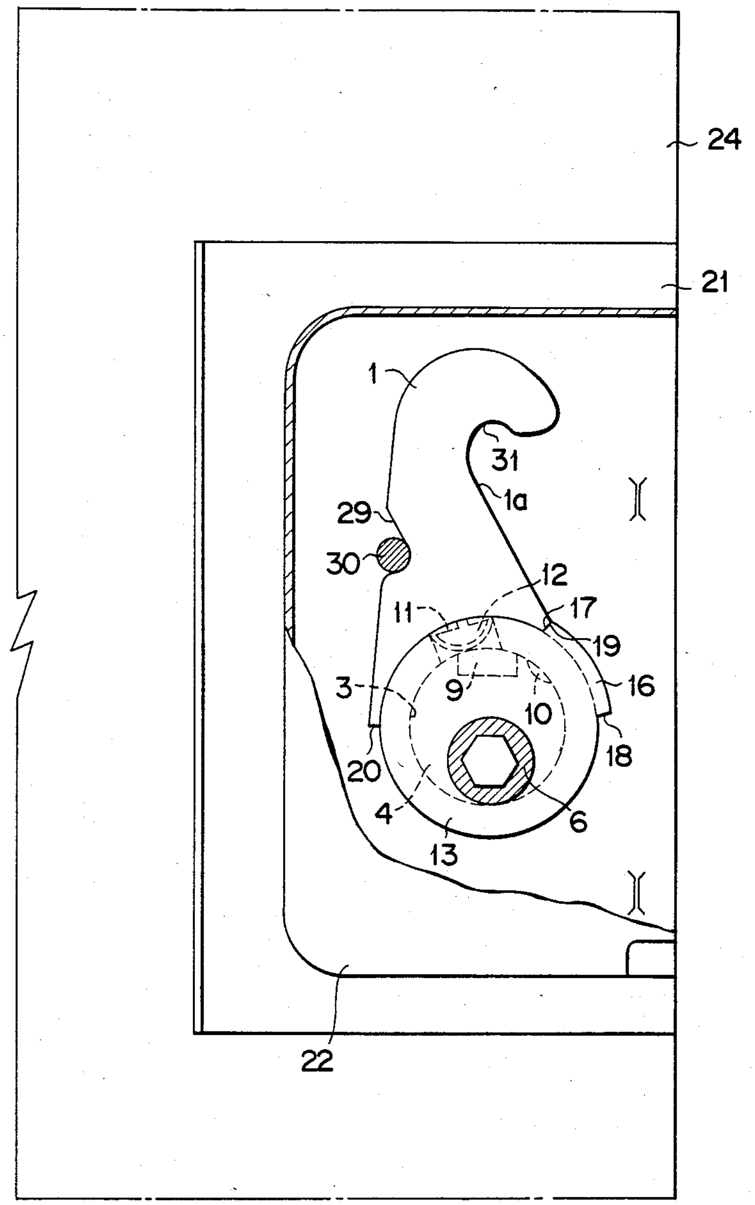
FIG. 7 is a sectional view taken along a line A—A' of FIG. 3, illustrating an essential part of the first section shown in FIGS. 1 through 3 in the state where the first section is buried in one of the panels and the whole of a hook plate is embedded in the first section.
Figure 8:
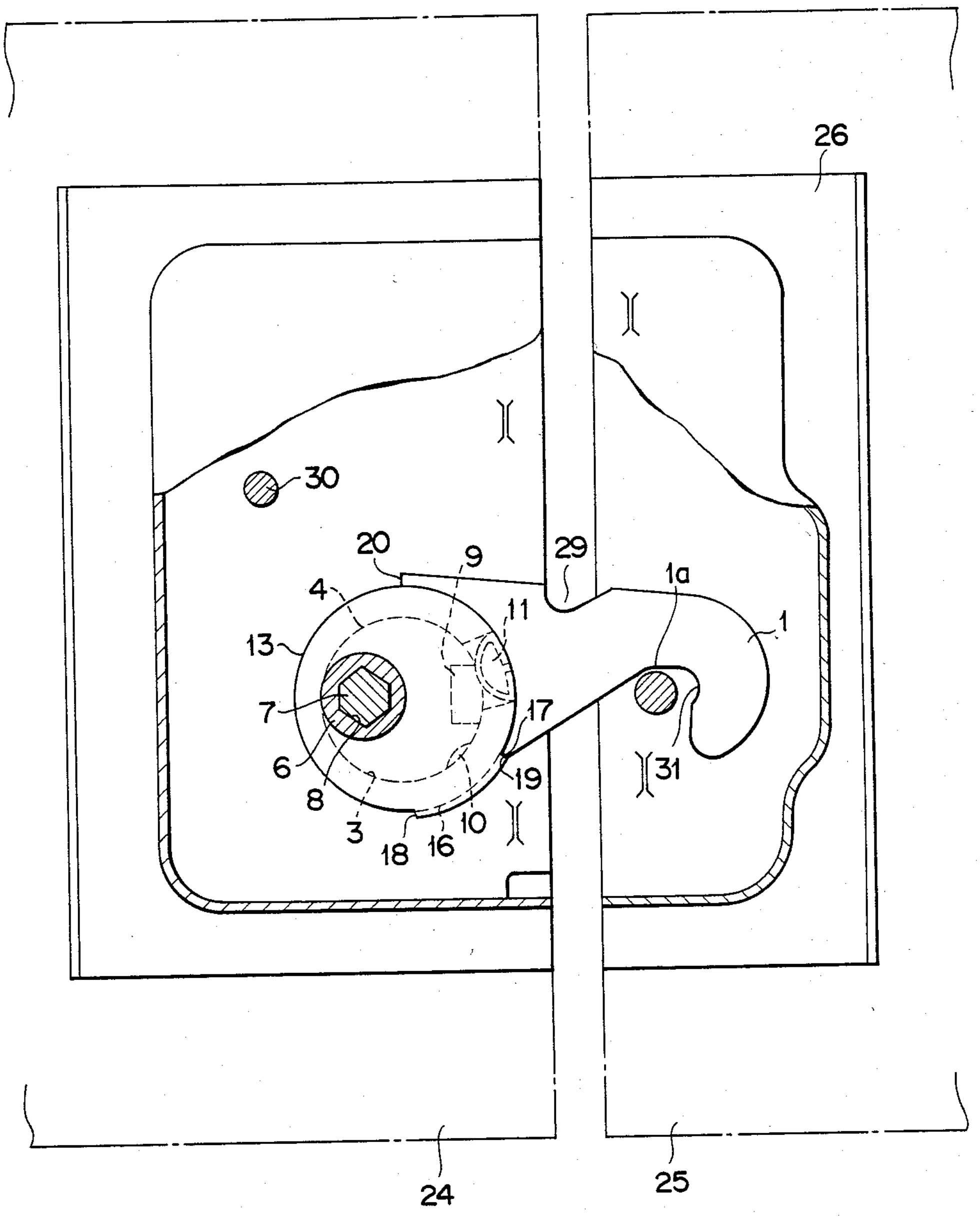
FIG. 8 is a partly sectioned front elevational view of the whole of the panel fastener in accordance with the preferred embodiment of the invention in the state where the second section shown in FIGS. 4 through 6 is buried in the other panel and the hook plate shown in FIG. 7 is rotated to enter the second section.
Figure 9:
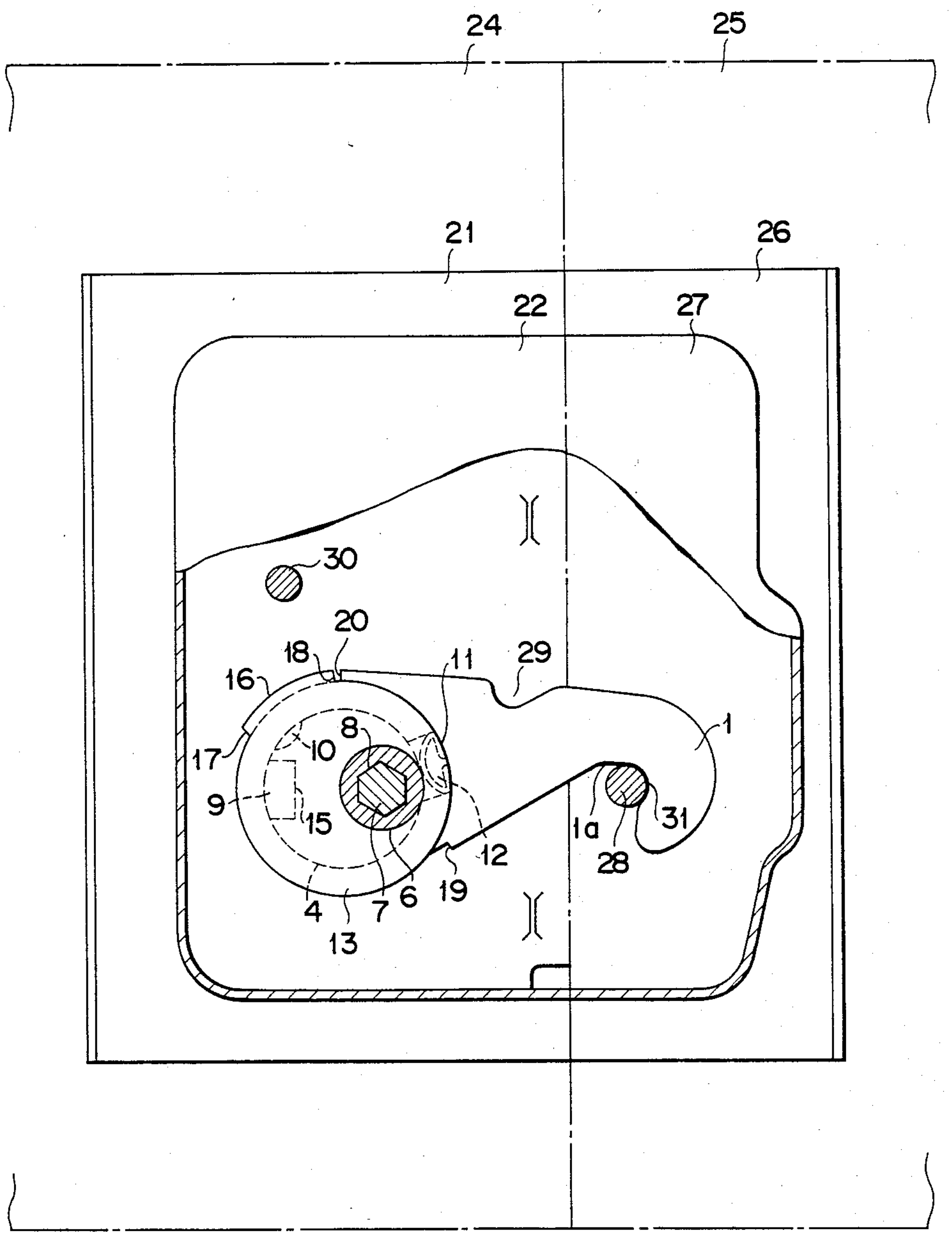
FIG. 9 is a partly sectioned front elevational view of the whole of the above-mentioned panel faster in the state where the hook plate is pulled back toward the first section from the position shown in FIG. 8 to establish a tight fastening between the panels.

The first section 21 of the panel fastener is buried and secured in a foam-molded panel 24 according to a conventional method. A second section 26 of the panel fastener having a pin 28 stretched between a pair of side plates 27, 27 is buried and secured in a foam-molded panel 25 as the mate to the panel 24. Before assembling the panels, the hook plate 1 is retreated inside the first section 21, and a notch 29 formed in an intermediate side edge of the hook plate 1 is engaged by a support pin 30 stretched between the side plates of the first section 21, as shown in FIG. 7. Moreover, one end surface 17 of the stopper projection 16 of the rotational angle-restricting disc 13 is brought into contact with one stopper wall 19 of the hook plate 1, thereby preventing the eccentric cam 4 from rotating counter-clockwise with respect to the hook plate 1. In FIG. 7, as the eccentric cam 4 is rotated clockwise by means of the rotational operation member 7, the hook plate 1 is rotated together with the eccentric cam 4 by the function of the leaf spring 11. When a side edge 1*a* of the hook plate 1 abuts against the pin 28 as shown in FIG. 8, the eccentric shaft 6 is on an extension of a segment of a line connecting the pin 28 and the center of the eccentric cam 4 with each other. As the eccentric cam 4 is further rotated clockwise by 180 degrees, the hook plate 1 is pulled back toward the first section 21 by a given stroke as shown in FIG. 9, and the panel 25 is drawn toward the panel 24 by the hook plate 1 with an end hook portion 31 thereof engaged by the pin 28, thereby allowing the panels 24 and 25 to be connected and fastened to each other. Any clockwise excessive rotation of the eccentric cam 4 is prevented by the arrangement that the other end surface 18 of the stopper projection 16 of the rotational angle-restricting disc 13 abuts against the other stopper wall 20 of the hook plate 1.

As will be fully understood from the foregoing description, since the panel fastener according to the invention is provided with means for limiting the forward and reverse rotational angles of the eccentric cam 4 with respect to the hook plate 1 within a required range, there are no possibilities that an erroneous reverse operation of the eccentric cam 4 may hinder a tight engagement between the hook plate 1 and the pin 28 and that an excessive rotational operation of the eccentric cam undesirably may undo the engagement once established, thereby allowing anyone to connect and fasten the panels together easily and reliably.

What is claimed is:

1. A panel fastener for connecting and fastening together dual mating panels, said fastener comprising: a first section secured to one panel and a second section secured to the other panel, said first section including a hook plate provided rotatably an eccentric cam provided in said first section, rotatably fitted in a cam receiving hole formed in a proximal end of said hook plate; a C-shaped leaf spring mounted in a free state in a spring-mounting recess formed in a part of an inner peripheral surface of said cam receiving hole and also in a relief recess formed in a part of an outer peripheral surface of said eccentric cam, a circular portion of said leaf spring slipping out of said relief recess when said eccentric cam is rotated by a rotational operation member inserted into a receiving hole formed in an eccentric shaft of said eccentric cam, and thereby said leaf spring causing a frictional force between said eccentric cam and said hook plate; said second section comprising a pin provided therein, whereby said hook plate is rotated together with said eccentric cam owing to said frictional force when said eccentric cam is rotated by said rotational operation member, and said eccentric cam is further rotated to tightly engage an end hook portion of said hook plate with said pin after said hook plate is engaged with said pin; wherein said eccentric cam is provided with a larger-diameter guide disc part on one side surface thereof which slidably contacts with one side surface of said proximal end of said hook plate, said eccentric cam further being provided with a locking projection on the other side surface thereof, a rotational angle-restricting disc having a diameter equal to those of said proximal end of said hook plate and said guide disc part of said eccentric cam, said rotational angle-restricting disc being provided with an eccentric shaft-receiving hole and a locking projection-receiving slot, whereby said eccentric shaft and said locking projection being fitted with said eccentric shaft-receiving hole and said locking projection-receiving slot, respectively, prevent said rotational angle-restricting disc from rotating relative to said eccentric cam, said leaf spring being clamped between said guide disc part of said eccentric cam and said rotational angle-restricting disc, said angle-restricting disc being further provided with a stopper projection on a portion of an outer peripheral surface thereof, and said hook plate being further provided with stopper walls on both ends of circumferential surface of said proximal end portion, said stopper walls being spaced from each other, whereby one of end surfaces of said stopper projection abuts against one of said stopper walls to prevent an erroneous reverse operation of said eccentric cam, and the other end surfaces of said stopper projection abuts against the other of said stopper walls to prevent an excessive rotational operation of said eccentric cam.

* * * * *